United States Patent
Bijapur et al.

(10) Patent No.: US 11,562,459 B2
(45) Date of Patent: Jan. 24, 2023

(54) SELECTIVELY WRITING BACK DIRTY CACHE LINES CONCURRENTLY WITH PROCESSING

(71) Applicants: ADVANCED MICRO DEVICES, INC., Santa Clara, CA (US); ATI TECHNOLOGIES ULC, Markham (CA)

(72) Inventors: Noor Mohammed Saleem Bijapur, San Diego, CA (US); Ashish Khandelwal, San Diego, CA (US); Laurent Lefebvre, Markham (CA); Anirudh R. Acharya, San Diego, CA (US)

(73) Assignees: ADVANCED MICRO DEVICES, INC., Santa Clara, CA (US); ATI TECHNOLOGIES ULC, Markham (CA)

(*) Notice: Subject to any disclaimer, the term of this patent is extended or adjusted under 35 U.S.C. 154(b) by 0 days.

(21) Appl. No.: 17/128,388

(22) Filed: Dec. 21, 2020

(65) Prior Publication Data
US 2021/0398242 A1    Dec. 23, 2021

Related U.S. Application Data

(60) Provisional application No. 63/041,337, filed on Jun. 19, 2020.

(51) Int. Cl.
*G06F 12/0804*    (2016.01)
*G06T 1/60*    (2006.01)
(Continued)

(52) U.S. Cl.
CPC ........... *G06T 1/20* (2013.01); *G06F 12/0804* (2013.01); *G06F 12/0806* (2013.01);
(Continued)

(58) Field of Classification Search
None
See application file for complete search history.

(56) References Cited

U.S. PATENT DOCUMENTS 6,553,460 B1 *  4/2003  Chopra ............... G06F 12/0808
                                                712/E9.032
8,627,007 B1 *  1/2014  Huang ................ G06F 12/0855
                                                711/158

(Continued)

OTHER PUBLICATIONS

International Search Report and Written Opinion dated Oct. 1, 2021 for PCI/US2021/037363, 10 pages.

*Primary Examiner* — Joni Hsu (57) ABSTRACT

A graphics pipeline includes a cache having cache lines that are configured to store data used to process frames in a graphics pipeline. The graphics pipeline is implemented using a processor that processes frames for the graphics pipeline using data stored in the cache. The processor processes a first frame and writes back a dirty cache line from the cache to a memory concurrently with processing of the first frame. The dirty cache line is retained in the cache and marked as clean subsequent to being written back to the memory. In some cases, the processor generates a hint that indicates a priority for writing back the dirty cache line based on a read command occupancy at a system memory controller.

18 Claims, 4 Drawing Sheets

(51) Int. Cl.
  *G06T 1/20*     (2006.01)
  *G06F 12/0888*  (2016.01)
  *G06F 12/0806*  (2016.01)
  *G09G 5/39*         (2006.01)

(52) U.S. Cl.
  CPC ............ *G06F 12/0888* (2013.01); *G06T 1/60* (2013.01); *G09G 5/39* (2013.01); *G09G 2360/121* (2013.01)

(56) References Cited

U.S. PATENT DOCUMENTS

| | | |
|---|---|---|
| 9,639,466 B2 | 5/2017 | Robertson et al. |
| 10,599,578 B2 | 3/2020 | Farahani et al. |
| 2013/0346699 A1* | 12/2013 | Walker ................. G06F 12/0891 711/128 |
| 2014/0122809 A1* | 5/2014 | Robertson ........... G06F 12/0804 711/E12.017 |
| 2017/0018247 A1* | 1/2017 | Frederiksen ........... G09G 5/395 |
| 2017/0150159 A1* | 5/2017 | Lee ........................ H04N 19/52 |
| 2017/0277640 A1 | 9/2017 | Jin et al. |
| 2019/0102324 A1 | 4/2019 | Ozsoy et al. |
| 2019/0243780 A1* | 8/2019 | Gopal ................. G06F 12/0811 |
| 2019/0251026 A1 | 8/2019 | Lowe-Power et al. |

\* cited by examiner

SELECTIVELY WRITING BACK DIRTY CACHE LINES CONCURRENTLY WITH PROCESSING

BACKGROUND

Processing systems including graphics processing units (GPUs) implement a cache hierarchy (or multilevel cache) that uses a hierarchy of caches of varying speeds to store frequently accessed data. Data that is requested more frequently is typically cached in a relatively high speed cache (such as an L1 cache) that is deployed physically (or logically) closer to a processor core or compute unit. Higher-level caches (such as an L2 cache, an L3 cache, and the like) store data that is requested less frequently. A last level cache (LLC) is the highest level (and lowest access speed) cache and the LLC reads data directly from system memory and writes data directly to the system memory. Caches differ from memories because they implement a cache replacement policy to replace the data in a cache line in response to new data needing to be written to the cache line. For example, a least-recently-used (LRU) policy replaces data in a cache line that has not been accessed for the longest time interval by evicting the data in the LRU cache line and writing new data to the LRU cache line. The GPU processes data on a frame-by-frame basis, e.g., a graphics pipeline in the GPU renders one frame at a time. Thus, the cache hierarchy used to cache data for the graphics pipeline evicts dirty data from the caches at the end of one frame and before the start of the subsequent frame. Evicting the dirty data requires writing the dirty cache lines back to system memory, which consumes a significant amount of bandwidth and leads to bottlenecks for traffic between the cache hierarchy and the system memory. The bottlenecks have a significant performance impact on the GPU at the start of the subsequent frame because of the constrained bandwidth for reading new data into the clean cache lines and writing dirty cache lines back to the system memory.

BRIEF DESCRIPTION OF THE DRAWINGS

The present disclosure is better understood, and its numerous features and advantages made apparent to those skilled in the art by referencing the accompanying drawings. The use of the same reference symbols in different drawings indicates similar or identical items.

DETAILED DESCRIPTION

FIGS. 1-4 disclose systems and techniques for reducing bottlenecks in the available bandwidth between a last level cache (LLC) and system memory during frame transitions in a graphics processing unit (GPU) by selectively writing back the data in dirty cache lines of the LLC based on a read command occupancy that indicates a number of pending read commands for the system memory. The data that is written back to the system memory is retained in the dirty cache lines, which are marked to indicate that the data in the marked cache lines has been written back to the system memory so the marked cache line can be treated as a clean cache line, e.g., during the transition from a first frame to a second frame. In some embodiments, dirty cache lines are selectively written back to the system memory by comparing the read command occupancy to one or more thresholds. For example, if the read command occupancy is less than a first threshold, data in the dirty cache lines is transmitted to a system memory controller (SMC) that writes the data back to the system memory. If the read command occupancy is greater than a second threshold (which is larger than the first threshold), a request to write the dirty cache lines back to the system memory is sent to the SMC with a hint that indicates that writing the data back to the system memory is low priority. The SMC therefore serves the pending read requests before performing the low priority writes to the system memory. If the read command occupancy is greater than a third threshold (which is larger than the second threshold), requests to write the dirty cache lines back to the system memory are not transmitted to the SMC.

Figure 1:
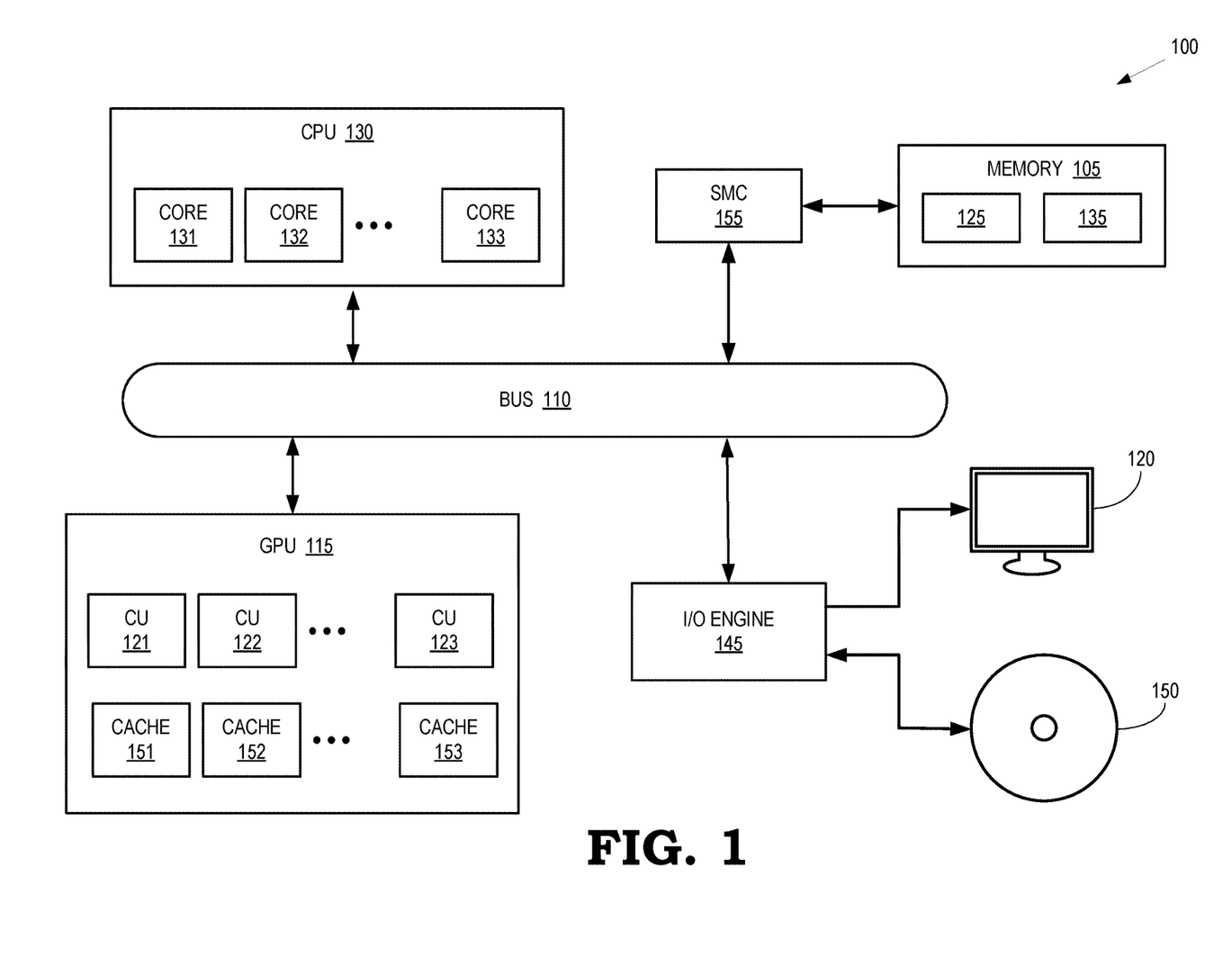
FIG. 1 is a block diagram of a processing system that selectively writing back dirty cache lines concurrently with processing according to some embodiments.

FIG. 1 is a block diagram of a processing system 100 that selectively generates writing back dirty cache lines concurrently with processing according to some embodiments. The processing system 100 includes or has access to a memory 105 or other storage component that is implemented using a non-transitory computer readable medium such as a dynamic random-access memory (DRAM). However, in some cases, the memory 105 is implemented using other types of memory including static random-access memory (SRAM), nonvolatile RAM, and the like. The memory 105 is referred to as an external memory since it is implemented external to the processing units implemented in the processing system 100. The processing system 100 also includes a bus 110 to support communication between entities implemented in the processing system 100, such as the memory 105. Some embodiments of the processing system 100 include other buses, bridges, switches, routers, and the like, which are not shown in FIG. 1 in the interest of clarity.

The techniques described herein are, in different embodiments, employed at any of a variety of parallel processors (e.g., vector processors, graphics processing units (GPUs), general-purpose GPUs (GPGPUs), non-scalar processors, highly-parallel processors, artificial intelligence (AI) processors, inference engines, machine learning processors, other multithreaded processing units, and the like). FIG. 1 illustrates an example of a parallel processor, and in particular a graphics processing unit (GPU) 115, in accordance with some embodiments. The graphics processing unit (GPU) 115 renders images for presentation on a display 120. For example, the GPU 115 renders objects to produce values of pixels that are provided to the display 120, which uses the pixel values to display an image that represents the rendered objects. The GPU 115 implements a plurality of compute units (CU) 121, 122, 123 (collectively referred to herein as "the compute units 121-123") that execute instructions concurrently or in parallel. In some embodiments, the compute units 121-123 include one or more single-instruction-multiple-data (SIMD) units and the compute units 121-123 are aggregated into workgroup processors, shader arrays, shader engines, and the like. The number of compute units 121-123 implemented in the GPU 115 is a matter of design choice and some embodiments of the GPU 115 include more or fewer compute units than shown in FIG. 1. The compute units 121-123 can be used to implement a graphics pipeline, as discussed herein. Some embodiments of the GPU 115 are used for general purpose computing. The GPU 115 executes instructions such as program code 125 stored in the memory 105 and the GPU 115 stores information in the memory 105 such as the results of the executed instructions.

The processing system 100 also includes a central processing unit (CPU) 130 that is connected to the bus 110 and therefore communicates with the GPU 115 and the memory 105 via the bus 110. The CPU 130 implements a plurality of processor cores 131, 132, 133 (collectively referred to herein as "the processor cores 131-133") that execute instructions concurrently or in parallel. The number of processor cores 131-133 implemented in the CPU 130 is a matter of design choice and some embodiments include more or fewer processor cores than illustrated in FIG. 1. The processor cores 131-133 execute instructions such as program code 135 stored in the memory 105 and the CPU 130 stores information in the memory 105 such as the results of the executed instructions. The CPU 130 is also able to initiate graphics processing by issuing draw calls to the GPU 115. Some embodiments of the CPU 130 implement multiple processor cores (not shown in FIG. 1 in the interest of clarity) that execute instructions concurrently or in parallel.

An input/output (I/O) engine 145 handles input or output operations associated with the display 120, as well as other elements of the processing system 100 such as keyboards, mice, printers, external disks, and the like. The I/O engine 145 is coupled to the bus 110 so that the I/O engine 145 communicates with the memory 105, the GPU 115, or the CPU 130. In the illustrated embodiment, the I/O engine 145 reads information stored on an external storage component 150, which is implemented using a non-transitory computer readable medium such as a compact disk (CD), a digital video disc (DVD), and the like. The I/O engine 145 is also able to write information to the external storage component 150, such as the results of processing by the GPU 115 or the CPU 130.

In the illustrated embodiment, the compute units 121-123 in the GPU 115 include (or are associated with) one or more caches 151, 152, 153, which are collectively referred to herein as "the caches 151-153." The caches 151-153 can include an L1 cache, an L2 cache, an L3 cache, or other caches in a cache hierarchy. Portions of the caches 151-153 are used to implement texture caches for a graphics pipeline that is executed on the compute units 121-123. In the illustrated embodiment, the caches 151-153 are (or include) last level caches (LLC) that are the highest-level cache in the cache hierarchy. Thus, data is read directly from the memory 105 into the caches 151-153 and data is read directly back from the caches 151-153 to the memory 105.

The processing system 100 also includes a system memory controller (SMC) 155 that receives memory access requests from entities in the processing system. The SMC 155 services the memory access requests using data stored in the memory 105. In the illustrated embodiment, the compute units 121-123 process frames in the graphics pipeline. Processing of the frames includes writing data into cache lines in one or more of the caches 151-153. Cache lines that include data written by the compute units 121-123 that has not yet been written back to the memory 105 are referred to as "dirty" cache lines. The dirty cache lines are evicted from the caches 151-153 during transitions between frames processed by the computers 121-123. Evicting the dirty cache lines includes writing the data in the dirty cache lines back to the memory 105. However, the bandwidth and processing power required to evict all the dirty cache lines in the caches 151-153 can significantly reduce the bandwidth and processing power available to begin fetching data into the caches 151-153 for the new frame and processing the data.

To address this problem, the compute units 121-123 write back one or more dirty cache lines from the caches 151-153 to the memory 105 concurrently with processing the corresponding frames. The dirty cache lines that have been written back to the memory 105 are also retained in the caches 151-153 so that the data in the dirty cache line is available for processing of the current frame. However, the dirty cache line is marked as clean subsequent to being written back to the memory so that the dirty cache line does not have to be written back to memory during a transition between frames, thereby conserving memory bandwidth and processing power during the transition. In some cases, the compute units 121-123 generate hints that indicate priorities for writing back the dirty cache lines based on a read command occupancy at the SMC 155.

Figure 2:
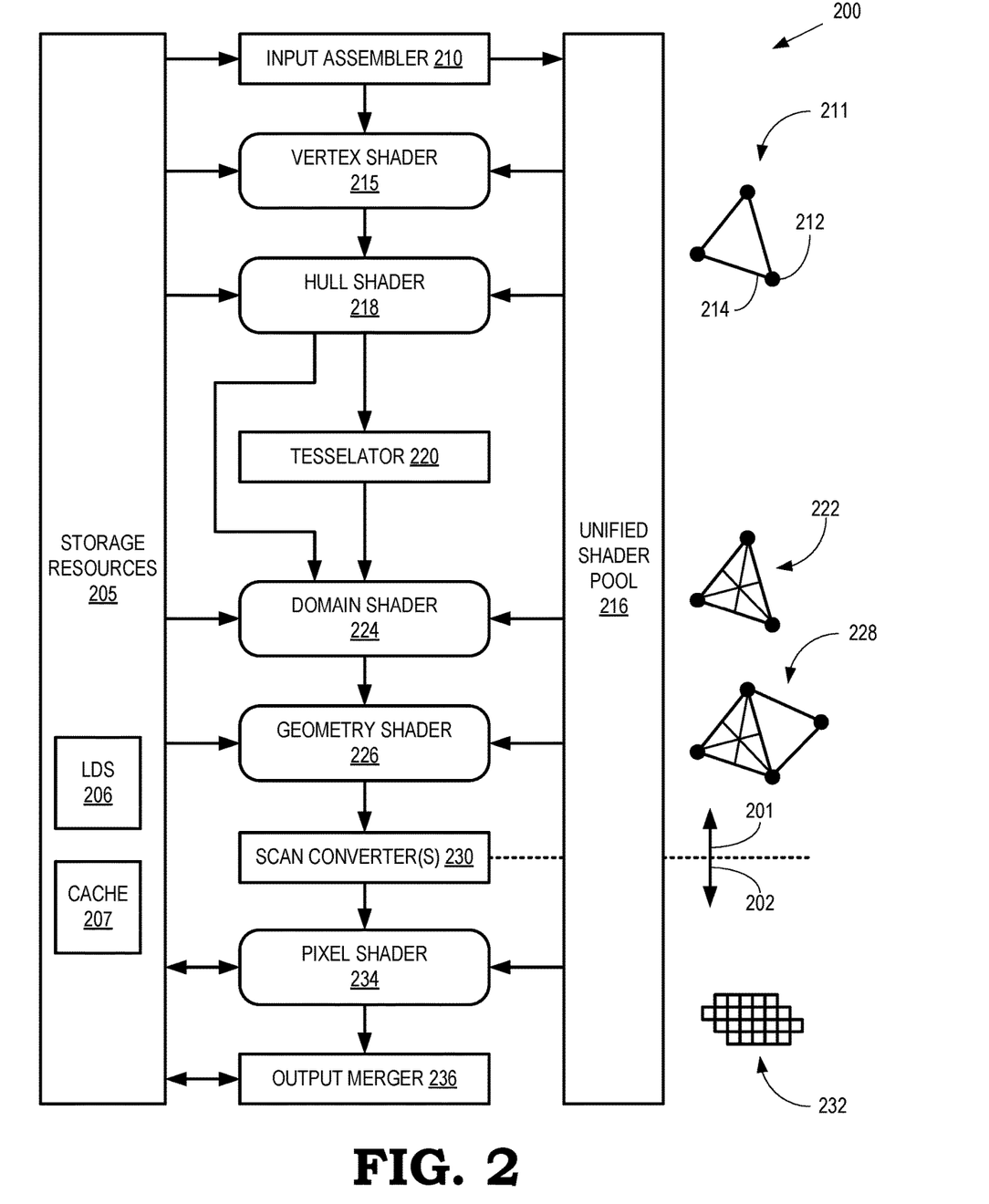
FIG. 2 depicts a graphics pipeline configured to process high-order geometry primitives to generate rasterized images of three-dimensional (3D) scenes at a predetermined resolution according to some embodiments.

FIG. 2 depicts a graphics pipeline 200 configured to process high-order geometry primitives to generate rasterized images of three-dimensional (3D) scenes at a predetermined resolution according to some embodiments. The graphics pipeline 200 is implemented in some embodiments of the processing system 100 shown in FIG. 1. The illustrated embodiment of the graphics pipeline 200 is implemented in accordance with the DX11 specification. Other embodiments of the graphics pipeline 200 are implemented in accordance with other application programming interfaces (APIs) such as Vulkan, Metal, DX12, and the like. The graphics pipeline 200 is subdivided into a geometry portion 201 that includes portions of the graphics pipeline 200 prior to rasterization and a pixel processing portion 202 that includes portions of the graphics pipeline 200 after rasterization.

The graphics pipeline 200 has access to storage resources 205 such as a hierarchy of one or more memories or caches that are used to implement buffers and store vertex data, texture data, and the like. In the illustrated embodiment, the storage resources 205 include local data store (LDS) 206 circuitry that is used to store data and caches 207 that are used to cache frequently used data during rendering by the graphics pipeline 200. The storage resources 205 are implemented using some embodiments of the system memory 105 shown in FIG. 1. As discussed herein, dirty cache lines in the caches 207 are selectively written back to system memory concurrently with processing frames using the data in the dirty cache lines to conserve memory bandwidth in graphics pipeline 200.

An input assembler 210 accesses information from the storage resources 205 that is used to define objects that represent portions of a model of a scene. An example of a primitive is shown in FIG. 2 as a triangle 211, although other types of primitives are processed in some embodiments of the graphics pipeline 200. The triangle 203 includes one or more vertices 212 that are connected by one or more edges 214 (only one of each shown in FIG. 2 in the interest of clarity). The vertices 212 are shaded during the geometry processing portion 201 of the graphics pipeline 200.

A vertex shader 215, which is implemented in software in the illustrated embodiment, logically receives a single vertex 212 of a primitive as input and outputs a single vertex. Some embodiments of shaders such as the vertex shader 215 implement massive single-instruction-multiple-data (SIMD) processing so that multiple vertices are processed concurrently. The graphics pipeline 200 implements a unified shader model so that all the shaders included in the graphics pipeline 200 have the same execution platform on the shared massive SIMD compute units. The shaders, including the vertex shader 215, are therefore implemented using a common set of resources that is referred to herein as the unified shader pool 216.

A hull shader 218 operates on input high-order patches or control points that are used to define the input patches. The hull shader 218 outputs tessellation factors and other patch data. In some embodiments, primitives generated by the hull shader 218 are provided to a tessellator 220. The tessellator 220 receives objects (such as patches) from the hull shader 218 and generates information identifying primitives corresponding to the input object, e.g., by tessellating the input objects based on tessellation factors provided to the tessellator 220 by the hull shader 218. Tessellation subdivides input higher-order primitives such as patches into a set of lower-order output primitives that represent finer levels of detail, e.g., as indicated by tessellation factors that specify the granularity of the primitives produced by the tessellation process. A model of a scene is therefore represented by a smaller number of higher-order primitives (to save memory or bandwidth) and additional details are added by tessellating the higher-order primitive.

A domain shader 224 inputs a domain location and (optionally) other patch data. The domain shader 224 operates on the provided information and generates a single vertex for output based on the input domain location and other information. In the illustrated embodiment, the domain shader 224 generates primitives 222 based on the triangles 211 and the tessellation factors. A geometry shader 226 receives an input primitive and outputs up to four primitives that are generated by the geometry shader 226 based on the input primitive. In the illustrated embodiment, the geometry shader 226 generates the output primitives 228 based on the tessellated primitive 222.

One stream of primitives is provided to one or more scan converters 230 and, in some embodiments, up to four streams of primitives are concatenated to buffers in the storage resources 205. The scan converters 230 perform shading operations and other operations such as clipping, perspective dividing, scissoring, and viewport selection, and the like. The scan converters 230 generate a set 232 of pixels that are subsequently processed in the pixel processing portion 202 of the graphics pipeline 200.

In the illustrated embodiment, a pixel shader 234 inputs a pixel flow (e.g., including the set 232 of pixels) and outputs zero or another pixel flow in response to the input pixel flow. An output merger block 236 performs blend, depth, stencil, or other operations on pixels received from the pixel shader 234.

Some or all the shaders in the graphics pipeline 200 perform texture mapping using texture data that is stored in the storage resources 205. For example, the pixel shader 234 can read texture data from the storage resources 205 and use the texture data to shade one or more pixels. The shaded pixels are then provided to a display for presentation to a user. As discussed herein, texture data used by shaders in the graphics pipeline 200 is cached using the cache 207. Dirty cache lines in the cache 207 are written back concurrently with processing a frame in the graphics pipeline 200 using the data in the cache 207.

Figure 3:
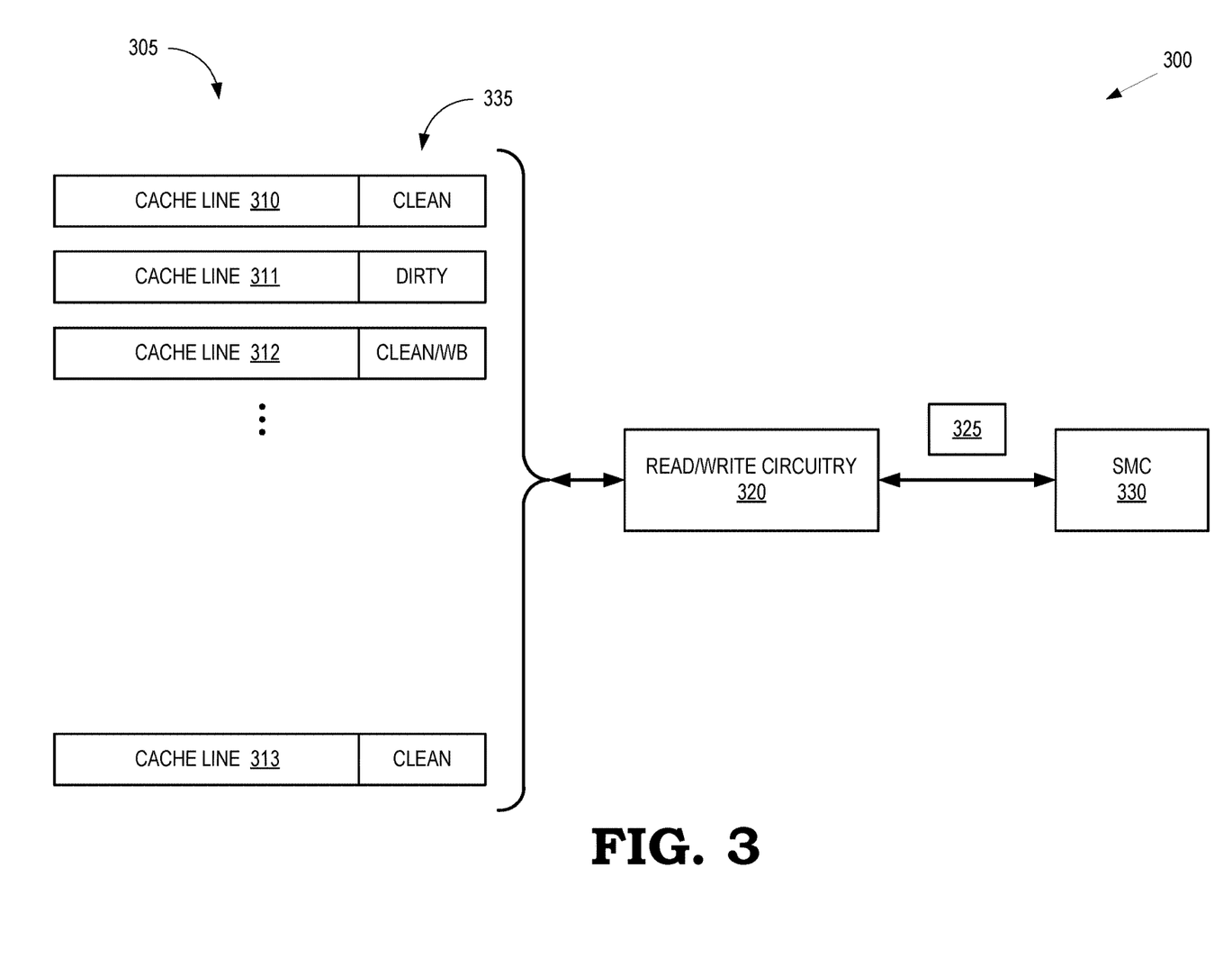
FIG. 3 is a block diagram of a portion of a memory system according to some embodiments.

FIG. 3 is a block diagram of a portion of a memory system 300 according to some embodiments. The memory system 300 is implemented in some embodiments of the processing system 100 shown in FIG. 1 and the graphics pipeline 200 shown in FIG. 2. The memory system 300 includes a cache 305 that includes cache lines 310, 311, 312, 313, which are collectively referred to herein as "the cache lines 310-313."

Data that is used by a graphics pipeline is fetched into one or more of the cache lines 310-313 using read/write circuitry 320 that sends requests 325 to an SMC 330. The SMC 330 serves the request 325 by fetching the requested data from a corresponding memory and providing the requested data to the read/write circuitry 320, which writes the requested data into one of the cache lines 310-313.

The read/write circuitry 320 writes the data in dirty cache line 310-313 back to the memory via the SMC 330 during a transition between frames being processed in the graphics pipeline. The read/write circuitry 320 also writes data in some of the dirty cache lines 310-313 back to the memory via the SMC 330 concurrently with processing a frame using the data in the cache 305. The data in the dirty cache line 310-313 is retained in the cache 305 and the dirty cache line 310-313 is marked to indicate that the data has been written back. The dirty cache line 310-313 is therefore treated as a clean cache line that does not need to be written back to memory during transitions between frames. In the illustrated embodiment, the cache 305 includes status markers 335 associated with the cache lines 310-313. The status markers 335 indicate that the cache lines 310 and 313 are clean (i.e., the data in the cache lines 310 and 313 has not been modified during processing and therefore corresponds to the data currently stored at the associated address in the memory) and the cache line 311 is dirty (i.e., the data in the cache line 311 has been modified during processing but has not yet been written back to memory). The status markers 335 also indicate that the cache line 312 is in the clean/written back (CLEAN/WB) state, which indicates that the cache line 312 is dirty but the data in the cache line 312 has been written back to the memory so it can be treated as a clean cache line during frame transitions.

In some embodiments, the read/write circuitry 320 includes a hint with the request 325 to indicate a priority associated with the request to write back data from a dirty cache line. The hint is determined based on a read command occupancy, i.e., an occupancy of a queue or buffer in the SMC 330 that includes pending read commands that have not yet been serviced by the SMC 330. If the read command occupancy is relatively low, the hint indicates that the request 325 to write data from the dirty cache line back to the memory should be served as soon as possible. However, if the read command occupancy is relatively high, the hint indicates that the request 325 has a relatively low priority. The SMC 330 therefore serves the pending read commands (instead of the low priority write request 325) until the read command occupancy falls below a threshold. If the read command occupancy is above a maximum threshold, the read/write circuitry 320 bypasses transmission of requests 325 to write back information in dirty cache lines 310-313.

Figure 4:
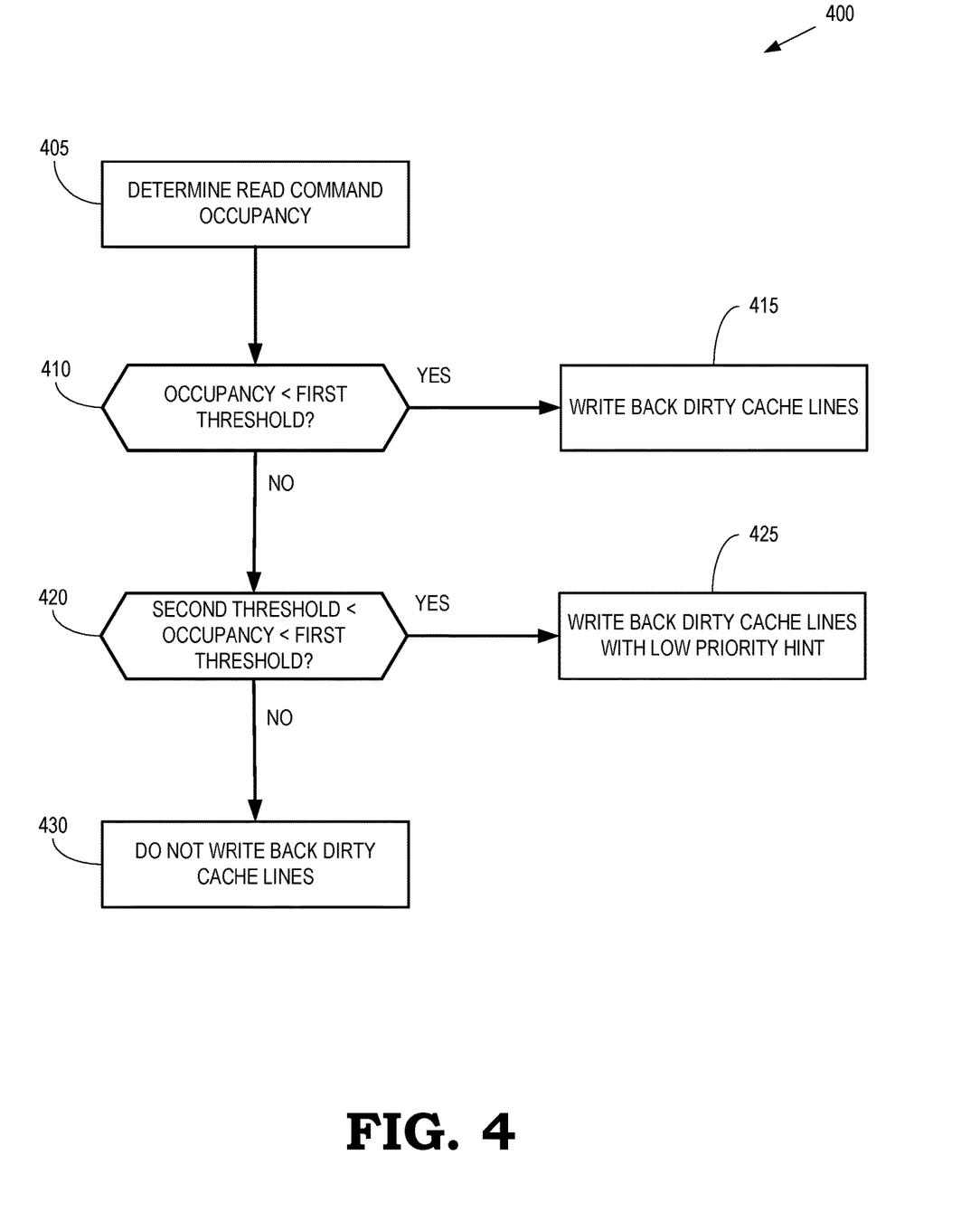
FIG. 4 is a flow diagram of a method of selectively writing back dirty cache lines concurrently with processing frames using data in the cache according to some embodiments.

FIG. 4 is a flow diagram of a method 400 of selectively writing back dirty cache lines concurrently with processing frames using data in the cache according to some embodiments. The method 400 is implemented in some embodiments of the processing system 100 shown in FIG. 1, the graphics pipeline 200 shown in FIG. 2, and the memory system 300 shown in FIG. 3.

At block 405, read/write circuitry determines a read command occupancy at an SMC in a memory subsystem including a cache. The read command occupancy indicates a fullness of a queue or a buffer used to hold pending read commands at the SMC.

At decision block 410, the read/write circuitry determines whether the read command occupancy is less than a first threshold. If so, the method 400 flows to the block 415, and the read/write circuitry sends requests for the SMC write back data in one or more dirty cache lines in the cache. If the read command occupancy is greater than the first threshold, the method 400 flows to the decision block 420.

At decision block 420, the read/write circuitry determines whether the read command occupancy is greater than the first threshold and less than a second threshold, which is greater than the first threshold. If so, the method 400 flows to the block 425 and the read/write circuitry requests that the SMC write back data in one or more dirty cache lines in the cache. The requests include a hint indicating that the request to write the data back is lower priority than continuing to process the requests in the read command queue or buffer. If the read command occupancy is greater than the second threshold, the method 400 flows to the block 430 and the read/write circuitry bypasses transmitting requests to write back dirty cache lines to the SMC (that is, bypasses writing back dirty cache lines).

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. An apparatus comprising:
   a cache comprising cache lines that are configured to store data used to process frames in a graphics pipeline; and
   a processor implementing the graphics pipeline, wherein the processor is configured to process a first frame and selectively write back a dirty cache line from the cache to a memory based on a read command occupancy at a system memory controller (SMC) and concurrently with processing of the first frame, wherein data in the dirty cache line is retained in the cache and marked as clean subsequent to being written back to the memory.

2. The apparatus of claim 1, wherein the processor is configured to transmit data in the dirty cache line to the SMC in response to the read command occupancy being less than a first threshold, wherein the SMC is configured to write the data received from the processor back to the memory.

3. The apparatus of claim 2, wherein the processor is configured to transmit the data in the dirty cache line to the SMC with a hint that indicates that writing the data back to the memory is a low priority in response to the read command occupancy being greater than the first threshold and less than a second threshold.

4. The apparatus of claim 3, wherein the SMC is configured to serve pending read requests before writing the data back to the memory in response to receiving the hint.

5. The apparatus of claim 4, wherein the processor is configured to bypass transmitting the data in the dirty cache line to the SMC in response to the read command occupancy being greater than the second threshold.

6. The apparatus of claim 1, wherein the processor is configured to bypass writing the dirty cache line back to the memory during a transition from the first frame to a second frame in response to the dirty cache line being marked as clean.

7. The apparatus of claim 6, wherein the processor is configured to write back data in dirty cache lines that are not marked as clean in response to completing processing of the first frame and initiating processing of a second frame.

8. A method comprising:
   processing, in a graphics pipeline, a first frame using data stored in cache lines of a cache associated with the graphics pipeline;
   selectively writing a dirty cache line from the cache back to a memory based on a read command occupancy at a system memory controller (SMC);

retaining the data in the dirty cache line in the cache; and
marking the dirty cache line as clean subsequent to the dirty cache line being written back to the memory.

9. The method of claim 8, wherein writing back the dirty cache line comprises transmitting data in the dirty cache line to the SMC in response to the read command occupancy being less than a first threshold.

10. The method of claim 9, further comprising:
writing the data received from the SMC back to the memory.

11. The method of claim 9, wherein writing back the dirty cache line comprises transmitting the data in the dirty cache line to the SMC with a hint that indicates that writing the data back to the memory is a low priority in response to the read command occupancy being greater than the first threshold and less than a second threshold.

12. The method of claim 11, further comprising:
serving, at the SMC, pending read requests before writing the data back to the memory in response to receiving the hint.

13. The method of claim 12, wherein selectively writing the dirty cache line back to the memory comprises bypassing transmission of the data in the dirty cache line to the SMC in response to the read command occupancy being greater than the second threshold.

14. The method of claim 8, further comprising:
bypassing writing the dirty cache line back to the memory during a transition from the first frame to a second frame in response to the dirty cache line being marked as clean.

15. The method of claim 14, further comprising:
writing back data in dirty cache lines that are not marked as clean in response to completing processing of the first frame and initiating processing of a second frame.

16. An apparatus comprising:
a set of compute units configured to implement a graphics pipeline; and
a last level cache (LLC) in a cache hierarchy associated with the compute units, wherein the compute units are configured to selectively write back dirty cache lines from the LLC to a memory based on a read command occupancy for a system memory controller (SMC) and concurrently with processing a first frame based on data stored in the dirty cache lines, and wherein the dirty cache lines are marked as clean subsequent to being written back to the memory.

17. The apparatus of claim 16, wherein the compute units are configured to determine priorities for writing back the dirty cache lines from the LLC to the memory based on the read command occupancy for the SMC.

18. The apparatus of claim 16, wherein the compute units are configured to bypass writing a dirty cache line back to the memory during a transition from the first frame to a second frame in response to the dirty cache line being marked as clean, and wherein the compute units are configured to write back data in dirty cache lines that are not marked as clean in response to completing processing of the first frame and initiating processing of a second frame.

* * * * *